Jan. 24, 1928.
V. BENDIX
BRAKE CONTROL
Filed Aug. 15, 1924
1,657,061
3 Sheets-Sheet 1
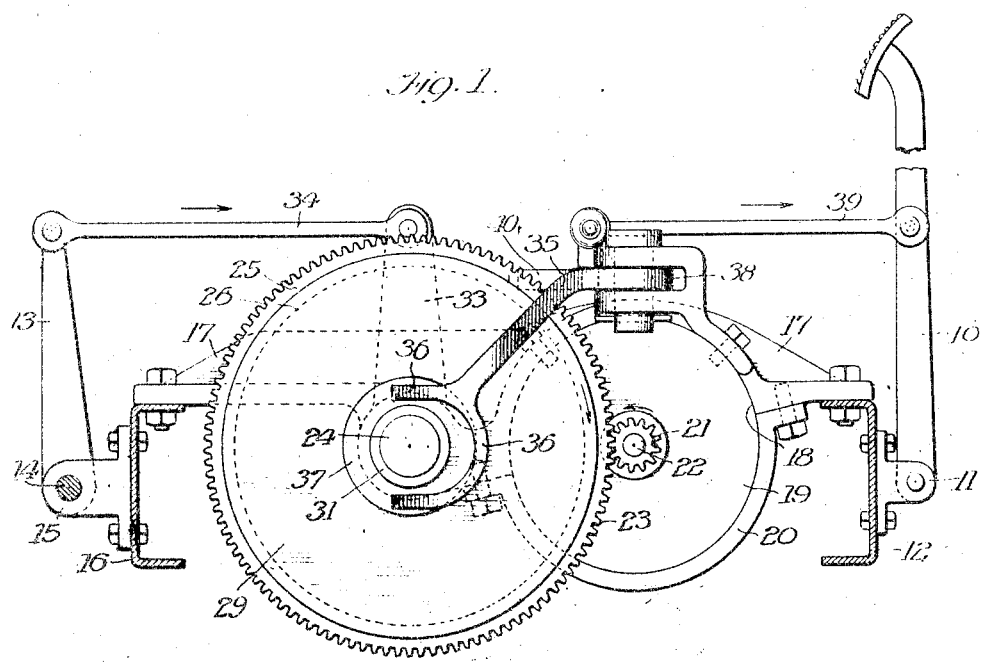
Fig. 1.
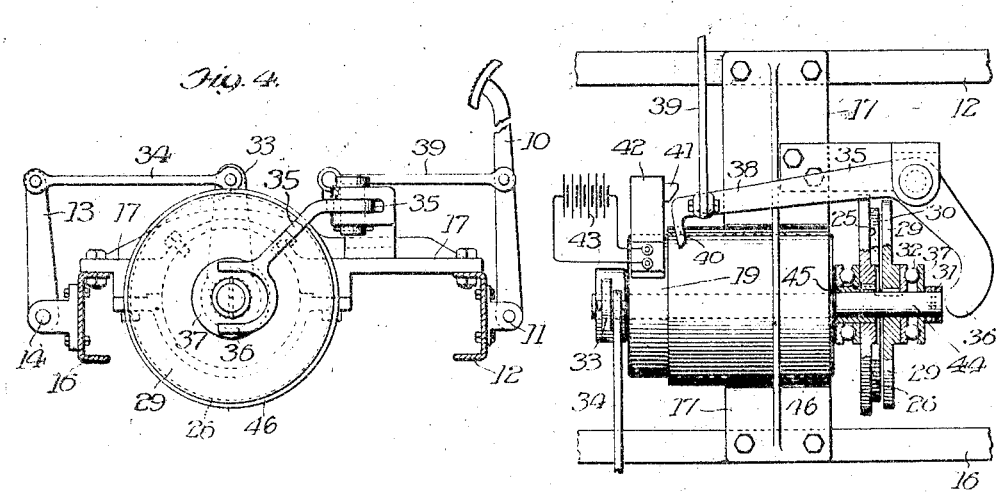
Fig. 4.
Fig. 5.
Witness
Martin H. Olsen
Inventor
Vincent Bendix
By Cromwell, Greist & Warden
Attys

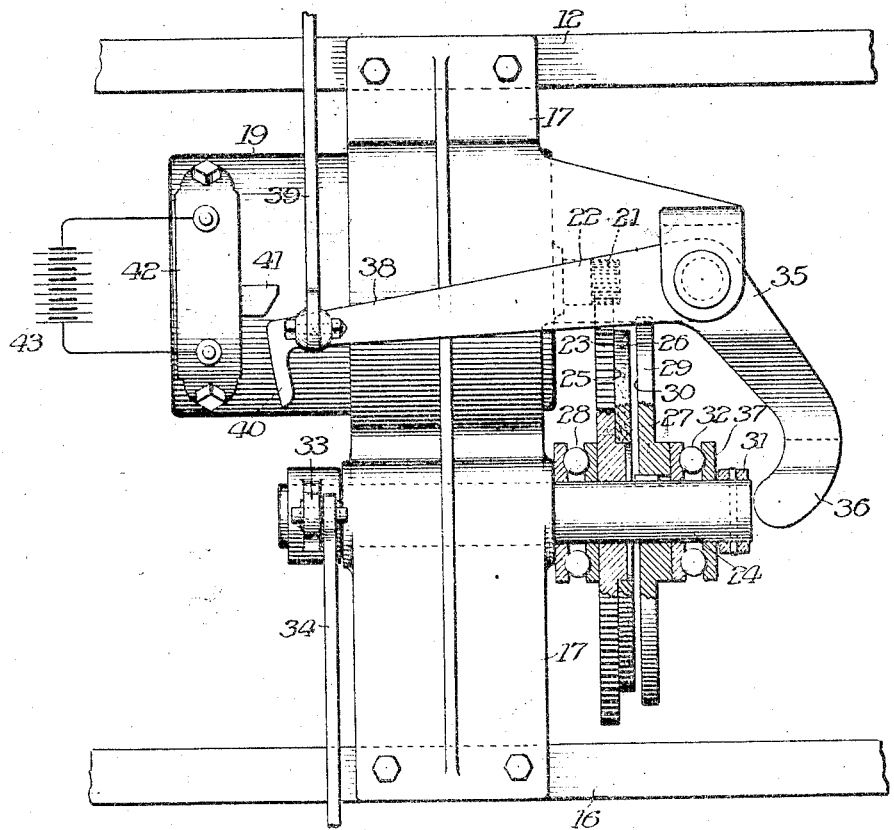

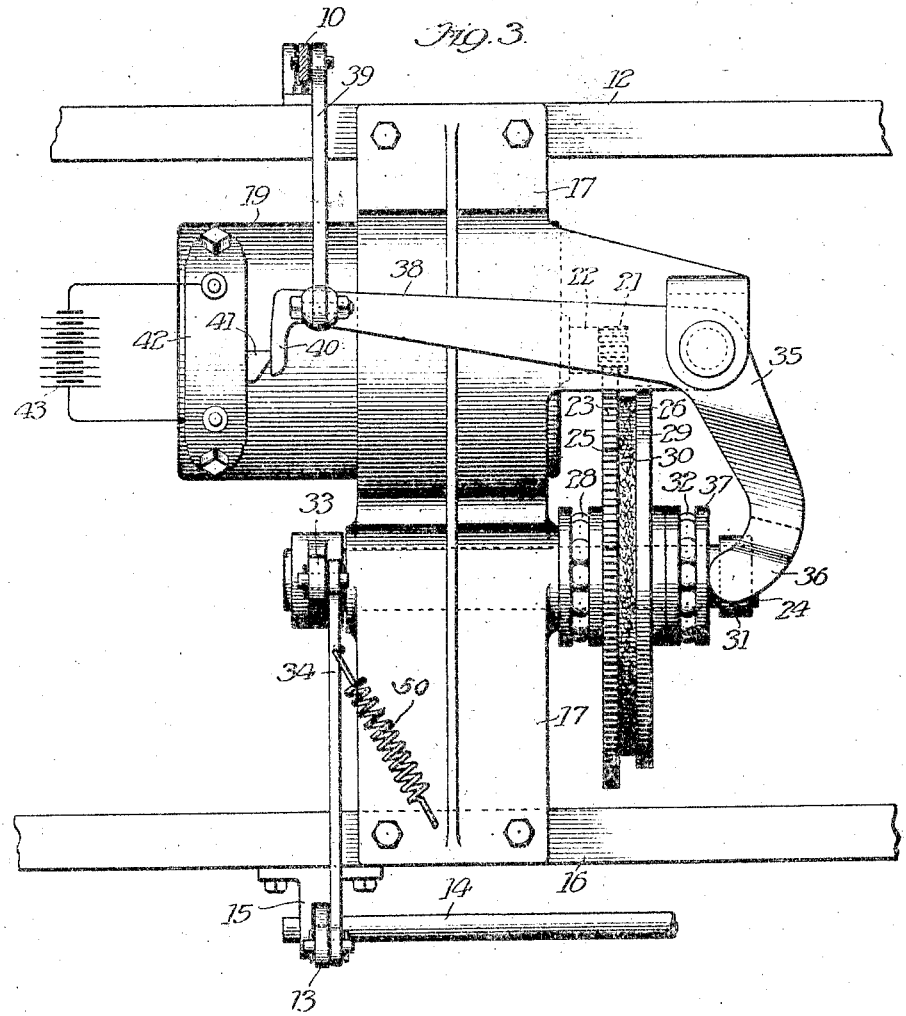

Patented Jan. 24, 1928.

1,657,061

UNITED STATES PATENT OFFICE.

VINCENT BENDIX, OF CHICAGO, ILLINOIS, ASSIGNOR TO BENDIX BRAKE COMPANY, OF SOUTH BEND, INDIANA, A CORPORATION OF ILLINOIS.

BRAKE CONTROL.

Application filed August 15, 1924. Serial No. 732,182.

This invention is concerned with a device for applying the brakes of vehicles.

For applying the brakes of a light vehicle the customary manually-operated linkage between the control pedal and the brakes is satisfactory, but for a heavy vehicle such as a large passenger bus or commercial truck the linkage mentioned is unsatisfactory because it is difficult for the operator to apply the brakes manually with sufficient force to overcome the momentum when an abrupt stop is necessary.

The object of the invention is to provide a power-operated device of improved construction, arrangement and operation, which is especially adapted for applying the brakes of heavy vehicles.

Other objects and advantages not specifically referred to will be appreciated upon an understanding of the nature of the invention as disclosed in the following detailed description and accompanying drawings, wherein is presented two embodiments of the invention.

The invention is obviously susceptible of modification in unessential details of construction, and the exemplifying embodiments presented are accordingly not intended to restrict the spirit of the invention short of its comprehensive scope as defined in the appended claims.

In the drawings,

Fig. 1 is a side view of one form of the device;

Fig. 2 is a top view of the same when not in operation;

Fig. 3 is a top view of the same when in operation;

Fig. 4 is a side view of another form of the device, and

Fig. 5 is a top view of the same when not in operation.

That form of the invention illustrated in Figs. 1, 2 and 3 of the drawings will first be described.

A control pedal 10 is pivoted at its lower end to a bracket 11 carried by a chassis member 12, and a torque arm 13 is secured at its lower end to a rockshaft 14 journaled in a bracket 15 carried by another rearwardly spaced chassis member 16. The arm 13 is adapted to be oscillated under the control of the pedal 10 by means hereinafter described, and the shaft 14 is caused by such oscillation to impart the desired reciprocating movement to the usual brake linkage connected with the same.

A supporting member 17 is secured at its ends to the chassis members 12 and 16, and carries in a concave seat 18 thereof a transversely disposed electric motor 19 which is fixedly positioned in the seat by a complementary yoke 20 removably secured to the same. A small pinion 21 is secured to the armature shaft 22 of the motor 19, and meshes with a large gear 23 journaled on a shaft 24. The shaft 24 is in turn journaled in a portion of the supporting member 17. One face of the gear 23 presents a disk-like friction surface 25 alongside which an annular friction mat 26 is positioned. The mat 26 is centered in floating relation to the friction surface 25 by an annular shoulder 27 on the gear 23, but may be secured fixedly to the surface. The other face of the gear 23 is spaced from the adjacent side of the supporting member 17 by a thrust bearing 28. A disk 29 is splined to the shaft 24, and presents on one face thereof a friction surface 30 normally spaced from, but frictionally engageable with, the friction surface 25 of the gear 23 through the intermediation of the friction mat 26. A collar 31 is secured to the adjacent end of the shaft 24, and the disk 29 is spaced from the collar by a thrust bearing 32. When the motor 19 is running and the disk 29 is shifted axially in one direction, the disk will frictionally engage with the rotating gear 23 and will tend to rotate the shaft 24 in a clockwise direction as viewed in Fig. 1.

A torque arm 33 is secured to the shaft 24 on that side of the supporting member 17 opposite to the gear and disk assembly, and is pivotally connected at its upper end to a rod 34, which is in turn pivotally connected to the upper end of the torque arm 13 on the rockshaft 14. When the shaft 24 is rotated a part of a revolution as a result of frictional engagement between the gear 23 and the disk 29, the torque arm 33 will transmit such oscillation to the rockshaft 14 and the brakes will be operated by power derived from the motor 19.

A bellcrank lever 35 is pivoted to a lateral extension of the supporting member 17. One end 36 of the lever 35 is positioned in alignment with the shaft 24, and is forked to bear at diametrically opposed points against the adjacent face 37 of the thrust bearing 32. The other end 38 of the lever 35 is universally connected to a rod 39 which is in turn pivotally connected to the control pedal 10 at a point above the bracket 11. An arcuate shoe 40 is provided on the end 38 of the lever 35 to depress a circuit-closing plunger 41 in a switchbox 42 of the circuit 43 of the motor 19. When the lever 35 is oscillated by the foot pedal 10, the shoe 40 of the lever depresses the plunger 41 to start the motor 19, and the end 36 of the lever forces the friction disk 29 axially into engagement with the friction surface 25 of the rotating gear 23.

The operation of the device is as follows:

When the control pedal 10 is depressed by the operator to apply the brakes, the motor 19 will start, the friction disk 29 will be forced axially into engagement with the friction surface 25 of the then rotating gear 23, the shaft 24 will be oscillated by the power transmitted thereto from the motor 19 through the gear 23 and the disk 29, and the rockshaft 14 will be correspondingly oscillated through the torque arms 13 and 33 and the rod 34, whereby to apply the brakes. When the pedal 10 is released and permitted to return to its normal position under the influence of a suitably positioned spring, the motor 19 will come to rest, the disk 29 will no longer be forced against the friction surface of the then stationary gear 23, and the shafts 24 and 14 will be permitted to return to their normal positions under the influence of a suitably positioned spring 50.

The device will deliver power from the motor to the brakes under the multiplication of torque provided by the pinion 21 and the gear 23, and will operate the brakes to any desired extent, dependent upon the extent to which the operator depresses the control pedal 10. The power employed is from a source independent of the vehicle motor, and is consequently available at any time.

That form of the invention illustrated in Figs. 4 and 5 differs from the first form in that the armature shaft of the motor and the shaft to which the disk 29 is nonrotatably secured are concentrically arranged with the latter shaft 44 within an axial bore of the armature shaft 45, the pinion 21 and the gear 23 are eliminated, and a disk 46 is secured to the tubular armature shaft 45 and presents the friction surface 25 for coaction with the friction surface 30 of the disk 29.

I claim:

1. A power-operated device for applying brakes, including a linkage for transmitting power to one or more brakes, a normally inactive electric motor, a circuit-closing switch for the motor, a relatively small pinion on the armature shaft of the motor, a shaft connected with the linkage, a relatively large gear journaled on the latter shaft in mesh with the pinion, an element splined on the latter shaft for movement axially thereof into coaction with the gear, and manually-controlled means to close the switch and move the element for energizing the motor and effecting coaction between the element and the gear, whereby to operate the brake or brakes with power derived from the motor.

2. A power-operated device for applying brakes, including a linkage for transmitting power to one or more brakes, a normally inactive electric motor, a circuit-closing switch for the motor, a relatively small pinion on the armature shaft of the motor, a shaft connected with the linkage, a relatively large gear journaled on the latter shaft in mesh with the pinion, a friction element splined on the latter shaft for movement axially thereof into coaction with a friction surface presented by the gear, and manually-controlled means to close the switch and move the friction element for energizing the motor and effecting coaction between the friction element and the friction surface of the gear, whereby to operate the brakes to any desired extent with power derived from the motor.

3. A manually-controlled power unit comprising, in combination, a motor, clutch elements, one of which is driven by the motor, a torque arm connected to the other clutch element and movable through an arc of less than 180°, brake-operating means connected to the torque arm, a brake pedal, and means operated by the brake pedal for forcing the clutch elements together.

4. A manually-controlled power unit comprising, in combination, a motor, a clutch element driven by the motor and a co-operating free clutch element, a brake-applying arm, a torque arm connected to the free clutch element and substantially parallel to the brake-applying arm, and movable through an arc of less than 180°, a rod connecting the torque arm and the brake-applying arm, and driver-controlled means for forcing the two clutch elements together.

5. A power unit comprising, in combination, a motor having a circuit including a switch, a clutch element driven by the motor through reduction gearing and a co-operating clutch element, a pedal lever operated by the pedal for closing the switch and forcing the clutch elements together, and means moved a relatively short distance by the clutch elements when they are forced together, which means is thereafter urged in the same direction by the slipping of the clutch elements.

6. An automobile brake-applying power unit comprising, in combination, brake-applying means, a supporting member arranged to bridge two frame members in line with the brake pedal, an electric motor mounted on the supporting member, and means operated by the motor and extending laterally of the unit and controlled by the pedal to cause application of the brake-applying means by the electric motor.

7. Brake-applying means comprising, in combination, parallel cross members 12 and 16, a pedal 10 mounted on one member 12, a brake-applying lever 13 mounted on the other member 16, and a power unit controlled by the pedal and including a supporting member 17 bridging the cross members 12 and 16, a motor mounted on the supporting member, a motor-driven element having a torque arm 33 connected to lever 13, and a power-controlling lever 35 connected to pedal 10.

In testimony whereof I have hereunto signed my name.

VINCENT BENDIX.